UNITED STATES PATENT OFFICE 2,132,712

FERMENTATION PROCESS FOR THE MANUFACTURE OF DEXTRO-LACTIC ACID

George E. Ward, Dunn-Loring, Va., Lewis B. Lockwood, Washington, D. C., and Orville E. May, Chevy Chase, Md., assignors to Henry A. Wallace, Secretary of Agriculture of the United States of America, and his successors in office No Drawing. Application June 25, 1936, Serial No. 87,326

2 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without payment to us of any royalty thereon.

Our invention relates to the preparation of dextro-lactic acid by the fermentation of carbohydrates by organisms of the fungus genera Rhizopus or Actinomucor. (The genus Actinomucor is the monotypic genus described by H. Zycha, Kryptogamenflora der Mark Brandenburg, (Leipzig) vol. VIa, pages 104–107 (1935), and W. Schostakowitsch, Berichte der deutschen botanischen Gesellschaft, vol. 16, pages 155–158 (1898).)

By dextro-lactic acid is meant the optically active lactic acid identical with sarcolactic acid obtained from flesh, particularly muscular tissue. In accord with modern nomenclature, this dextro-lactic acid is more properly termed levo (+) lactic acid, since from the viewpoint of stereochemistry it possesses the levo configuration, while at the same time its dilute aqueous solution rotates the plane of polarized light to the right. This acid, hereinafter referred to as dextro-lactic acid, is further characterized by the fact that its zinc salt is levorotatory.

The production of dextro-lactic acid by cultivating fungi on the surface of carbohydrate solutions has been previously observed. Thus Ehrlich (Berichte der deutschen chemischen Gesellschaft, 1919, vol. 52, page 63) reported the occurrence of small quantities of dextro-lactic acid in cultures of Rhizopus species, but the principal product obtained by him was fumaric acid. Kanel (Microbiology, 1934, U. S. S. R., vol. 3, page 239), reported that a fungus resembling Rhizopus japonicus converted about 30% to 50% of the consumed invert sugar or starch to dextro-lactic acid when it was allowed to develop on the surface of the nutrient solution for a period for 17 to 30 days. Work recently completed by us has shown that several species of Rhizopus are able to transform glucose to dextro-lactic acid, and that certain strains of Rhizopus oryzae can convert up to 62% of the fermented glucose to dextro-lactic acid when cultivated on the surface of suitable nutrient solutions for about 16 days.

Our invention differs from all previously described processes, as well as those set forth above, for the conversion of carbohydrate materials to lactic acid in that we have found that by treating a nutrient liquor containing various organic or inorganic constituents, along with varying concentrations of carbohydrates, with spores or mycelial fragments of certain fungi of the genera Rhizopus or Actinomucor, and agitating the solution so as to bring about intimate mixing of all the components of the system, at the same time supplying suitable quantities of air and maintaining the fermentation system under favorable temperature and pressure, the carbohydrate of the nutrient solution is converted to dextro-lactic acid more rapidly, and in greater yields, than in systems where the fungus develops on the surface of the nutrient solution.

It will be understood by those skilled in the art that in compelling the fungus to grow submerged in the nutrient solution, we are imposing an unnatural condition upon it, since the fungi of these genera normally form a mycelial pad on the surface of the solution from which they are deriving their energy.

At the present time, the lactic acid of commerce is manufactured by the bacterial fermentation of carbohydrate material, such as glucose, molasses, and crude wheys. Lactobacillus delbrucki, Streptococcus lactis, and closely related organisms are commonly employed, either in pure or mixed cultures. Such commercial fermentations result in the formation of racemic or optically inactive lactic acid, although as a rule either the dextro- or levo-form predominates to a slight extent.

Our invention possesses several important advantages over any of the lactic acid fermentations heretofore known.

*Firstly.*—The fungi of the genera Rhizopus and Actinomucor have very simple nitrogen requirements, compared to the lactic acid bacteria, and this attribute facilitates the recovery of a pure lactic acid or a pure salt of lactic acid, from the culture liquor at the completion of the fermentation. The fungi used by us utilize nitrogen in the form of simple inorganic ammonium salts or individual amino-acids, and require only about 0.1% to 0.2% of these compounds in the nutrient solution, whereas the lactic acid bacteria require relatively large amounts of a complex mixture of organic nitrogenous compounds. Thus malt sprouts, yeast autolysates, casein digests, and meat peptones are commonly used in concentrations as high as 3 grams per 100 cc. of nutrient solution, and such concentrations of extraneous organic material add to the difficulty of recovering a pure product.

*Secondly.*—The optimum carbohydrate concentration in the nutrient solution is much higher for the fungi used in our invention than for the lactic acid bacteria. The fungi of the genera Rhizopus and Actinomucor operate most satisfactorily in 15% to 20% carbohydrate solutions or suspensions, whereas the lactic acid bacteria are usually cultivated in solutions containing less than 10% carbohydrates. The ability of the fungi to ferment more concentrated carbohydrate solutions, or suspensions, is important for the reason that it permits the more efficient utilization of time and plant equipment.

*Thirdly.*—The fermentation of carbohydrates to lactic acid by the fungi of the genera Rhizopus or Actinomucor, when practiced according to our invention, proceds at a much faster rate than the bacterial fermentations heretofore known, and also proceeds at a much faster rate than similar lactic acid fermentations brought about by the fungi of the genera Rhizopus or Actinomucor and conducted according to any previously described methods. Thus Kanel, hereinbefore mentioned, in studying surface cultures of a species of Rhizopus, found that an incubation period of 20 to 24 days was necessary to effect complete fermentation of the carbohydrate present, and we have likewise found that when the normal surface fermentation is allowed to take place, an incubation period of 16 to 28 days is required by several species of fungi of the genus Rhizopus. However, when these same fungi are made to grow submerged in the nutrient liquor, after the manner of our invention, the fermentation process is completed within 4 or 5 days.

*Fourthly.*—The practice of our invention results in the formation of the optically active dextro-lactic acid, which has all the properties upon which are based the present industrial uses of optically inactive (racemic) lactic acid, and, in addition, has the valuable properties of being solid at room temperatures, when pure, and of being totally metabolized by the animal body. The later property suggests its use in nutritional and medicinal preparations.

We have found that dextro-lactic acid may be produced in good yields without the simultaneous or subsequent formation of levo-lactic acid, by the fermentation of carbohydrates by fungi of the genera Rhizopus and Actinomucor under the conditions hereinafter described. Thus, if our invention is practiced in a manner such that all the agitation of the solution or suspension is obtained by aeration, a much greater aeration rate will be required than will be found necessary if the solution is agitated by mechanical means. Also, the temperature range within which fungi of the genera Rhizopus and Actinomucor show good growth and lactic acid production is relatively great, lying as it does between temperatures of approximately 15° C. and 60° C. Similarly, the pressure at which the process is conducted may be varied greatly, say from atmospheric pressure to pressures of several atmospheres, depending on the apparatus in use and the conditions prevailing at any given time.

As typical apparatus within which our process may be successfully conducted, we cite the glass equipment used by May, Herrick, Moyer, and Wells (Industrial and Engineering Chemistry, (1934) vol. 26, page 575) for the production of gluconic acid, and the revolving aluminum drums developed by Herrick, Hellbach, and May (Industrial and Engineering Chemistry, (1935) vol. 27, page 681) for the industrial application of submerged mold fermentations.

EXAMPLES

All nutrient solutions here cited have the following composition:

|  | Grams per 100 cc. |
|---|---|
| Commercial glucose (8.0% moisture) (approximately) | 16.5 |
| $MgSO_4 \cdot 7H_2O$ | 0.025 |
| $KH_2PO_4$ | 0.060 |
| $NH_4NO_3$ | 0.288 |
| or Urea | 0.107 |

*Example 1*

200 cc. of nutrient solution of the above composition using $NH_4NO_3$ as the nitrogen source, was placed in a 500 cc. gas-washing bottle constructed with a sintered-glass false bottom and fitted with a ground glass stopper. After sterilization, there were added 15 grams of sterile $CaCO_3$, the solution was inoculated with a culture of *Rhizopus oryzae*, and then placed in an autoclave which maintained a constant temperature and pressure, and which was so fitted that the air was vented at a constant rate through the culture solution in the gas-washing bottle. After a fermentation period of 115 hours at 5 lbs. gage pressure and 30° C., with an aeration rate of 50 cc. per minute, the contents of the flask were analyzed. It was found that 29.2 grams of glucose had been consumed, and that 18.7 grams of dextro-lactic acid had been produced, equivalent to a yield of 64.0%.

*Example 2*

The same conditions were used as in Example 1, except that urea was used as the nitrogen source instead of $NH_4NO_3$. Analysis of the solution at 118 hours showed that 28.2 grams of glucose had been consumed and that 19.4 grams of dextro-lactic acid had been produced, equivalent to a yield of 68.8%.

*Example 3*

The same conditions were used as in Example 2, except that the rate of aeration was 200 cc. per minute. Analysis of the solution at 118 hours showed that 29.8 grams of glucose had been consumed and that 18.8 grams of dextro-lactic acid had been produced, equivalent to a yield of 63.1%.

*Example 4*

The same conditions were used as in Example 2, except that the temperature of incubation was 42° C. At the age of 95 hours, analysis of the solution showed that 28.8 grams of glucose had been consumed and that 15.80 grams of dextro-lactic acid had been produced, equivalent to a yield of 55.0%.

Having thus described our invention, what we claim for Letters Patent is:

1. A process for the production of dextro-lactic acid by fermentation, which comprises inoculating glucose solutions with *Rhizopus oryzae*, thence aerating and agitating the mass, and thence cultivating the fungus in a submerged state, thereby producing dextro-lactic acid.

2. A process for the production of dextro-lactic acid by fermentation, which comprises inoculating glucose solutions with *Rhizopus oryzae*, thence adding calcium carbonate, thence aerating and agitating the mass, and thence cultivating the fungus in a submerged state, thereby producing dextro-lactic acid.

GEORGE E. WARD.
LEWIS B. LOCKWOOD.
ORVILLE E. MAY.